(12) United States Patent
Feng et al.

(10) Patent No.: US 10,902,353 B2
(45) Date of Patent: Jan. 26, 2021

(54) MONITORING TICKETS ON TRANSPORTATION SYSTEMS

(71) Applicant: International Business Machines Corporation, Armonk, NY (US)

(72) Inventors: Kai Feng, Beijing (CN); Shuang Shuang Jia, Beijing (CN); Yong Tang, Beijing (CN); Jun Long Xiang, Beijing (CN); Xin Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 15/445,353

(22) Filed: Feb. 28, 2017

(65) Prior Publication Data
US 2018/0247230 A1  Aug. 30, 2018

(51) Int. Cl.
*G07B 15/06* (2011.01)
*G06Q 20/04* (2012.01)
(Continued)

(52) U.S. Cl.
CPC .......... *G06Q 10/02* (2013.01); *G06Q 20/045* (2013.01); *G06Q 20/0457* (2013.01);
(Continued)

(58) Field of Classification Search
CPC .... G06Q 10/00; G06Q 10/02; G06Q 30/0284; G06Q 50/30; H04W 24/00; G08G 1/123;
(Continued)

(56) References Cited

U.S. PATENT DOCUMENTS 6,839,560 B1 *  1/2005  Bahl .................... G01C 21/206
                                                       342/450
8,332,272 B2 * 12/2012  Fisher .................... H04W 4/21
                                                        705/16
(Continued)

FOREIGN PATENT DOCUMENTS

CN    103186928 A    7/2013
CN    103259848 A    8/2013
(Continued)

OTHER PUBLICATIONS

"Light Rail Fare Compliance," Program Evaluation and Audit, Metropolitn Cuncil (Year: 2015).*
(Continued)

*Primary Examiner* — George Chen
*Assistant Examiner* — Brian Adams Heflin
(74) *Attorney, Agent, or Firm* — Alex Harvey

(57) ABSTRACT

The present invention provides a computer implemented method, system, and computer program product for monitoring a ticket, the method including receiving credentials by a processing unit from a device via manual presentation of the device to a manual sensor logically coupled to the processing unit, generating a ticket identifier (ID) based on the credentials, transmitting the ticket ID from the processing unit to the device, establishing a wireless connection between the device and the processing unit, checking the wireless connection before each occurrence of an event, checking the wireless connection after each occurrence of the event, and updating a status of a ticket in light of the checking. In an exemplary embodiment, a ticket system includes a processing unit, a manual sensor, a wireless sensor, and a device, where the processing unit transmits the ticket ID, and where the processing unit verifies continued connection at key events.

16 Claims, 4 Drawing Sheets

(51) Int. Cl.
  *G06Q 20/32* (2012.01)
  *G06Q 20/34* (2012.01)
  *G06Q 10/02* (2012.01)
  *G07B 15/02* (2011.01)

(52) U.S. Cl.
  CPC .......... *G06Q 20/32* (2013.01); *G06Q 20/327* (2013.01); *G06Q 20/352* (2013.01); *G07B 15/02* (2013.01); *G07B 15/063* (2013.01)

(58) Field of Classification Search
  CPC .... G06F 17/24; G06F 17/243; G06F 17/2785; G06F 17/2765; G06F 3/0484; G06F 3/04845; G06F 3/04847
  USPC .......................................................... 705/13
  See application file for complete search history.

(56) References Cited

U.S. PATENT DOCUMENTS

| | | | |
|---|---|---|---|
| 10,332,162 B1* | 6/2019 | Brock ................. | G06Q 30/0284 |
| 2010/0082491 A1 | 4/2010 | Rosenblatt et al. | |
| 2010/0201505 A1 | 8/2010 | Honary et al. | |
| 2010/0204505 A1 | 8/2010 | Kataoka et al. | |
| 2011/0153495 A1 | 6/2011 | Dixon et al. | |
| 2012/0101942 A1* | 4/2012 | Park ..................... | G07B 15/02 |
| | | | 705/40 |
| 2012/0254040 A1* | 10/2012 | Dixon ................... | G06Q 20/10 |
| | | | 705/44 |
| 2015/0115028 A1 | 4/2015 | Montealegre | |
| 2015/0235477 A1* | 8/2015 | Simkin ................. | G07B 15/02 |
| | | | 705/417 |
| 2016/0063405 A1* | 3/2016 | Calabrese ............. | H04W 4/027 |
| | | | 705/7.28 |
| 2016/0117867 A1 | 4/2016 | Yuan | |
| 2017/0220958 A1 | 8/2017 | Schucan et al. | |

FOREIGN PATENT DOCUMENTS

| | | |
|---|---|---|
| CN | 105389857 A | 3/2016 |
| KR | 1020120078374 A | 7/2012 |
| WO | 2011066327 A1 | 6/2011 |

OTHER PUBLICATIONS

"Accelerated Examination Support Document," International Business Machines Corporation, Dated Sep. 15, 2017, 16 pages.

Feng et al., "Monitoring Tickets on Transportation Systems," U.S. Appl. No. 15/718,739, filed Sep. 28, 2017.

List of IBM Patents or Patent Applications Treated as Related, Dated Sep. 20, 2017, 2 pages.

"Light Rail Fare Compliance," Program Evaluation and Audit, Metropolitan Council, Apr. 2015, 20 pages.

* cited by examiner

MONITORING TICKETS ON TRANSPORTATION SYSTEMS

BACKGROUND

The present invention relates to ticketing systems, and more particularly to a computer implemented method, a system, and a computer program product for monitoring tickets on transportation systems.

SUMMARY

One aspect of the present invention provides a computer implemented method, a system, and a computer program product for monitoring a ticket. In an exemplary embodiment, the method including receiving credentials by a processing unit from a device via manual presentation of the device to a manual sensor logically coupled to the processing unit, generating a ticket identifier (ID) by the processing unit based on the credentials, transmitting the ticket ID from the processing unit to the device, establishing a wireless connection between the device and the processing unit, checking the wireless connection before each occurrence of an event, checking the wireless connection after each occurrence of the event, updating a status of a ticket associated with the ticket ID in light of the checking, and charging the account a fee based on the status.

Another aspect of the present invention provides, the system includes a processing unit, a manual activation sensor logically coupled to the processing unit, a wireless sensor capable of reading wireless signatures, and a device to interact with the manual activation sensor and the wireless sensor, where the manual activation sensor establishes a first connection channel between the device and the manual activation sensor via manual activation, where the processing unit receives credentials from the device via the manual activation sensor, where the processing unit generates a ticket ID based on the credentials, where the processing unit registers the device through the first connection channel by at least receiving the credentials from the device, where the wireless sensor establishes a wireless connection through a second connection channel between the device and the wireless sensor, where the processing unit transmits the ticket ID to the device, where the processing unit verifies that the processing unit is able to connect with the device via the second connection channel before each occurrence of an event, and where the processing unit verifies that the processing unit is able to connect with the device and that the device is in a range of the processing unit after each occurrence of the event.

Another aspect of the present invention provides, the computer program product includes a non-transitory computer readable storage medium having program instructions embodied therewith, the program instructions readable and executable by a processor to cause the processor to perform a method including receiving credentials by a processing unit from a device via manual presentation of the device to a manual sensor logically coupled to the processing unit, generating a ticket ID by the processing unit based on the credentials, transmitting the ticket ID from the processing unit to the device, establishing a wireless connection between the device and the processing unit, checking the wireless connection before each occurrence of an event, checking the wireless connection after each occurrence of the event, updating a status of a ticket associated with the ticket ID in light of the checking, and charging the account a fee based on the status.

DETAILED DESCRIPTION

Figure 1:
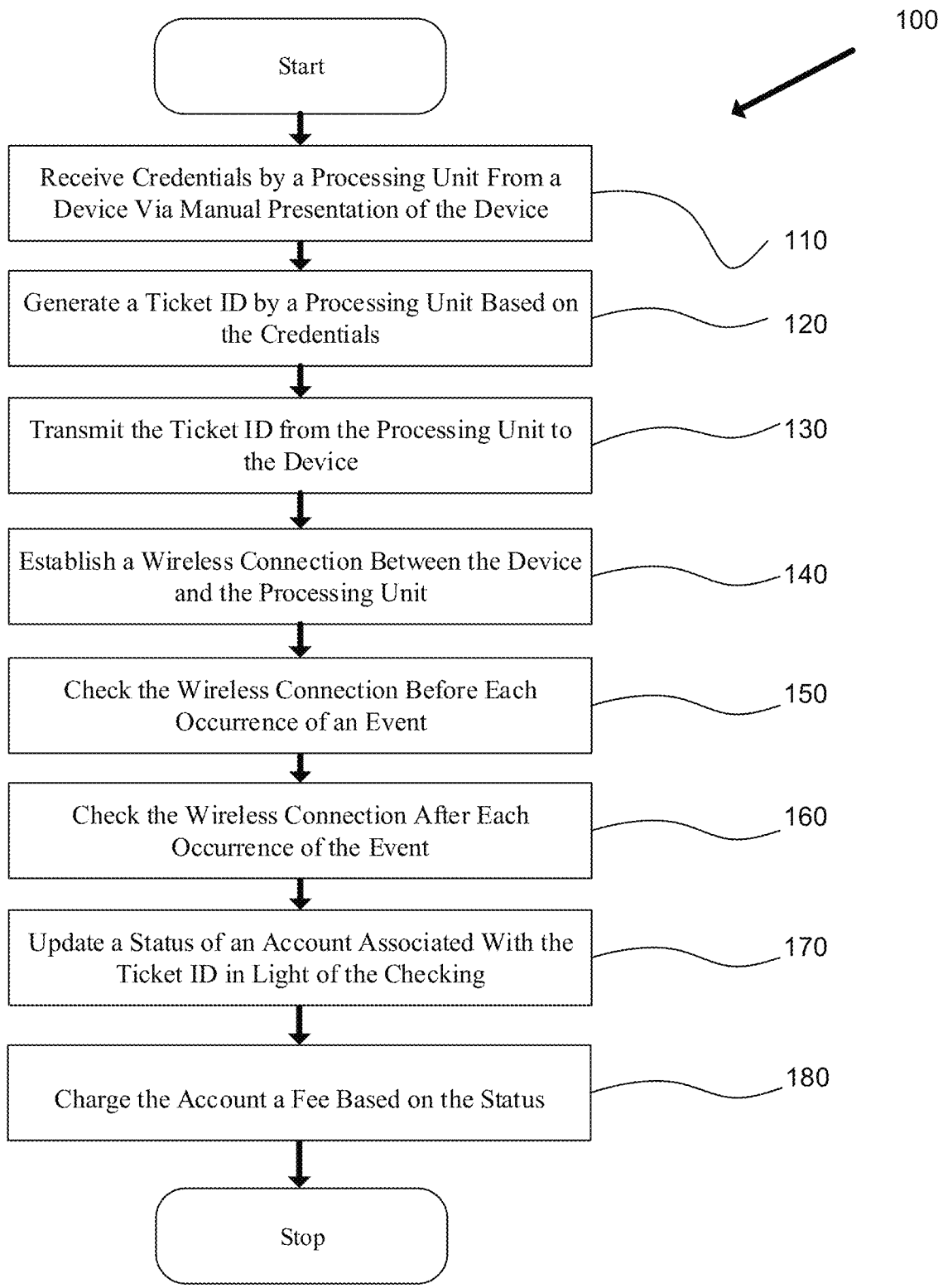
FIG. 1 is a flowchart according to an embodiment of the present invention.

The present invention provides a computer implemented method, a system, and a computer program product for monitoring a ticket. In an exemplary embodiment, the method includes receiving credentials by a processing unit from a device via manual presentation of the device to a manual sensor logically coupled to the processing unit, generating a ticket identifier (ID) by the processing unit based on the credentials, transmitting the ticket ID from the processing unit to the device, establishing a wireless connection between the device and the processing unit, checking the wireless connection before each occurrence of an event, checking the wireless connection after each occurrence of the event, updating a status of an account associated with the ticket ID in light of the checking, and charging the account a fee based on the status. In one embodiment, the present invention is used as a ticketing system on a mass transit vehicle such as a train, trolley, or bus. For example, a passenger of a mass transit vehicle could use his/her device to manually check in, and then the processing unit could record for how long or for how many stops the device is on the vehicle. In one embodiment, the system is used on a bus. In one embodiment, the event is the opening and closing of the bus door. One embodiment of the invention allows for the processing unit to track when the device gets on and off the bus. The two-check system, one check before the event and one check after the event, could allow for a particular passenger to get off the vehicle to allow other passengers room to exit and then, for the particular passenger to re-board the vehicle before the second check.

Some existing bus systems require passengers to manually check in when getting on a bus and manually check out when getting off the bus. However, the design of these systems creates two issues.

The first issue is ticket evading. Current ticketing systems contain a potential risk which could be used by freeloaders to evade the ticket fee. This could result in economic loss for bus companies. For example, if a passenger checks out at an earlier stop of a vehicle and the passenger gets off the vehicle, the present invention would only charge the passenger for part of the actual ride of the passenger.

Ticket evading is a very common and serious problem in the world. In Chile, the bus system suffers from significant losses every year. Also, the Nanjing metro suffers from significant losses due to ticket evading, e.g. a loss of 8 million RMB. Similarly, the French mass transit system suffers from significant losses due to freeloading, e.g. a loss of 500 million euro.

In one embodiment, the present invention solves the ticket evading issue by implementing a twostep exit procedure. Once a ticket is checked into the system, the system will check the ticket before and after each stop. If a passenger shields a ticket device to give a false checkout, the system will register that it prematurely lost the connection to the ticket device. The device will then charge an account associated with the ticket a fee.

In another embodiment, the present invention solves the ticket evading issue by monitoring the signal strength of the ticket device before the system loses connection with the device. If the profile of the signal loss does not match a standard profile associated with a ticket device moving off of a vehicle, the system will be able to determine that the device was intentionally shielded to avoid the ticket fee. In one example, the signal strength of the ticket device will become weaker gradually as the passenger walks away from the vehicle or the vehicle moves away from the passenger. If the passenger shields the ticket device, the abrupt signal loss will enable the system determine that device was being shielded to evade the ticket fee. The system can then charge an account associated with the ticket a penalty fee.

The second limitation is inconvenience. When passengers disembark from a crowded bus, manually checking out one by one at the bus station could cause congestion. This could lead to safety problems due to the congestion at those checkout points.

Existing ticketing systems either do not prevent freeloading or make the passengers swipe out with a physical ticket. In one embodiment, the present invention allows for an automatic check out by wirelessly logging tickets of passengers as they get off the vehicle without any manual interaction, thereby preventing freeloading and making the checkout process more convenient for passengers by keeping their hands free. In one embodiment of the present invention, a ticket system checks the status of the ticket by wireless signal without requiring the user to interact with a ticket device or the system during the checkout process. The ticket system is able to determine when the ticket device should be checked out by monitoring when the ticket device loses its connection to the ticket system.

Existing ticketing systems do not have real time monitoring of the status of passenger. In one embodiment of the present invention, WI-FI is used to monitor the status (on or off the bus) of passengers in real time.

In some existing wireless ticketing systems, there is the potential to evade the ticketing system by shielding a device. In one embodiment of the present invention, a twice check mechanism prevents ticket evading by intentional or unintentional signal shielding, and records whether or not a passenger got off the bus.

Manual checkout systems may cause congestion near the checkout terminal at each stop. In one embodiment of the present invention, when the bus is crowded, passengers will not have to wait in line to manually check out, thereby preventing congestion and related security risks. The ticket system will monitor when each ticket device loses connection with the ticket system, the ticket system will then check out the ticket device automatically.

Currently it is hard to accurately track data for how long passengers ride and what portion of the routes passengers ride on mass transit. In one embodiment of the present invention, the data obtained from the present invention is logged for big data and cloud companies. The data could then be used for statistical analysis and data mining.

Installing expensive new equipment for ticketing systems may be cost prohibitive. In one embodiment, the present invention utilizes some existing equipment on mass transportation systems. For example, the present invention is compatible with Wi-Fi technology presently installed on many mass transit vehicles. For passengers, mobile payment is increasingly popular. The present invention could be combined with mobile devices by using a mobile device as ticket card.

Referring to FIG. 1, in one embodiment the present invention provides a method 100 including a step 110 of receiving credentials by a processing unit from a device via manual presentation of the device to a manual sensor logically coupled to the processing unit, a step 120 of generating a ticket ID by the processing unit based on the credentials, a step 130 of transmitting the ticket ID from the processing unit to the device, a step 140 of establishing a wireless connection between the device and the processing unit, a step 150 of checking the wireless connection before each occurrence of an event, a step 160 of checking the wireless connection after each occurrence of the event; a step 170 of updating a status of an account associated with the ticket ID in light of the checking, and a step 180 of charging the account a fee based on the status.

In one embodiment, the event includes opening and closing of a door on a vehicle that includes the processing unit. In one embodiment, the vehicle is a public transit bus, and the event is the opening and closing of the rear door of the vehicle. In an embodiment, the processing unit runs a check before the door opens and after the door closes. In a further embodiment, the check before the door is open verifies that the processing unit can still connect to the device. In a further embodiment, the processing unit connects or tries to connect to the device after the door is shut. If the device is outside of a certain signal strength, then the processing unit determines that the device is no longer on the bus and closes out the ticket, assuming the passenger has ended the ride. In a further embodiment, the processing unit checks to see that the device is still connected before opening the door. When the processing unit loses connection before the door is opened, the processing unit triggers an exception to prevent people from intentionally shielding their devices. If the processing unit did not perform this check, the processing unit would falsely record that a device got off at an earlier stop. An exception would also account for a device malfunctioning.

In one embodiment, the checking includes recording a signal strength of the wireless connection, and comparing the signal strength to a lookup table to determine a distance of the device from the processing unit. In an embodiment, by comparing the signal strength to a table with known signal strengths at different distances, the location of the device is determined. In one embodiment, once a device is farther away than the extent of a vehicle, the processing unit determines that the device is no longer on the vehicle.

In another embodiment, the present invention solves the ticket evading issue by monitoring the signal strength of the ticket device before the system loses connection with the device. If the system abruptly loses a connection with the device, the system will be able to determine that the device was intentionally shielded to avoid the ticket fee.

In one embodiment, the checking further includes generating an exception value indicating a loss of the wireless connection during the checking before an occurrence of the event. In one embodiment, the exception value is processed as the device is being shielded or is powered down. In a particular embodiment, an associated account is charged a fee for the exception value.

In one embodiment, the updating includes charging an account associated with the ticket ID a fee based on the exception value. In a further embodiment, the fee charged could be for the entire route of the bus. In an alternative embodiment, the fee charged could be a fee associated with the normal route for that device. For example, if a device is normally taken from stop A to stop D, but the device is shielded or powered down before stop C, then the processing unit could charge an account associated with the device the full fare from stop A to stop D. In an alternative embodiment, the fee could be a flat fee.

In one embodiment, the device is a portable electronic device. In a particular embodiment, the device is a mobile phone. In an alternative embodiment, the device is a tablet computer. In an alternative embodiment, the device is a card with embedded wireless technology. In a further embodiment, the card has a magnetic strip.

In one embodiment, the method further includes determining a location of the device via at least one sensor. In a further embodiment, three sensors could be used to triangulate the position of the device. In an alternative embodiment, two sensors could be used to narrow down the location of the device such that if one sensor were placed at the front center of a bus and another sensor were placed at the back center of the bus, the sensors could accurately determine if the device was still located on the bus. Thus, the two-check system could be used to determine when the device gets off the bus.

Figure 2A:
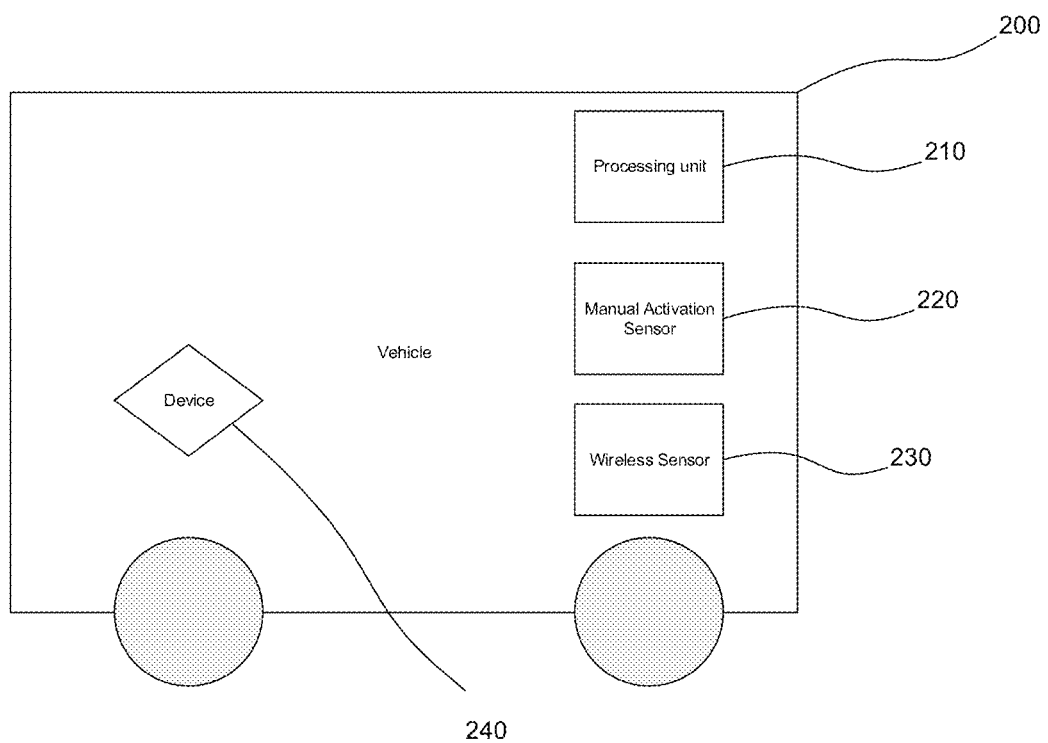
FIG. 2A is a side view of a vehicle with the ticketing system according to an embodiment of the present invention.
Figure 2B:
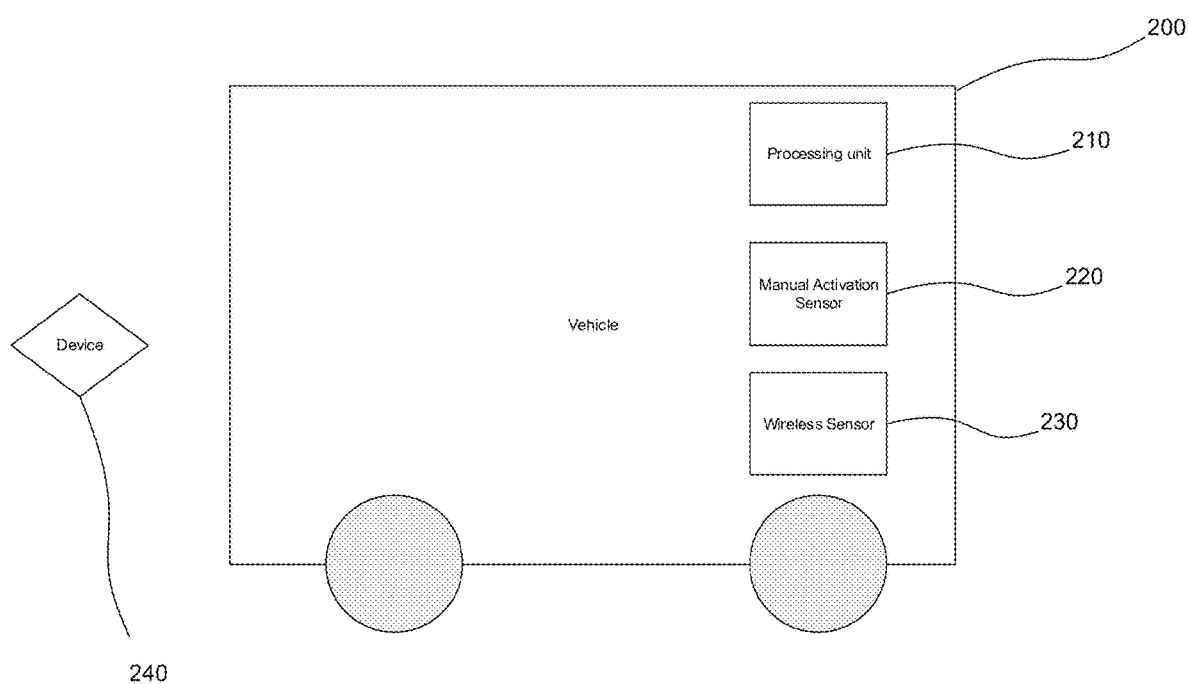
FIG. 2B is a side view of a vehicle with the ticketing system according to an embodiment of the present invention.

Referring to FIGS. 2A and 2B, in one embodiment, a ticket system includes a processing unit 210 installed on a vehicle 200, a manual activation sensor 220 logically coupled to processing unit 210, a wireless sensor 230 capable of reading wireless signatures, and a device 240 to interact with manual activation sensor 220 and wireless sensor 230, where manual activation sensor 220 establishes a first connection channel between device 240 and manual activation sensor 220 via manual activation, where processing unit 210 receives credentials from device 240 via the manual activation sensor 220, where processing unit 210 generates a ticket identifier (ID) based on the credentials, where processing unit 210 registers device 240 through the first connection channel by at least receiving the credentials from device 240, where wireless sensor 230 establishes a wireless connection through a second connection channel between device 240 and wireless sensor 230, where processing unit 210 transmits the ticket ID to device 240, where processing unit 210 verifies that processing unit 210 is able to connect with device 240 via the second connection channel before each occurrence of an event, and where processing unit 210 verifies that processing unit 210 is able to connect with device 240 and that device 240 is in a range of processing unit 210 after each occurrence of the event. FIG. 2A depicts device 240 on vehicle 200, and FIG. 2B depicts device 240 off vehicle 200.

In one embodiment, device 240 is used by a passenger on a vehicle 200 that has the ticket system. For example, as the passengers enter vehicle 200, device 240 is brought close to or touches manual activation sensor 220. In a further embodiment, manual activation sensor 220 is one of a passive proximity card reader, an active proximity card reader, a magnetic stripe card reader, a smart card reader, a chip card reader, an integrated circuit card reader, a photo identification reader, a mechanical holecard reader, and a barcode reader. In a further embodiment, once processing unit 210 recognizes device 240, device 240 connects to processing unit 210 wirelessly and maintains that connection throughout the duration of the transit. In one embodiment, vehicle 200 makes multiple stops, and processing unit 210 checks device 240 to see if device 240 is still on vehicle 200 before and after each stop. For example, processing unit 210 could ensure that device 240 is not being tampered with and could determine if device 240 is still on vehicle 200 after each stop. Also, for example, checking to see that device 240 is still on vehicle 200 after the stop could ensure that device 240 of a passenger does not end the ride of the passenger who only briefly gets off vehicle 200 during the stop.

In one embodiment, the event includes opening and closing of a door on vehicle 200, vehicle 200 includes processing unit 210.

In one embodiment, processing unit 210 records a signal strength of the wireless connection and compares the signal strength to a lookup table to determine a distance of device 240 from processing unit 210. In one embodiment, the strength of the signal degrades as device 240 moves away from a vehicle 200, with processing unit 210 installed, or as vehicle 200 moves away from device 240. For example, by monitoring the signal strength, processing unit 210 could use the signal strength and a lookup table to determine the distance of device 240 from processing unit 210, and once device 240 is far enough away from processing unit 210, processing unit 210 could determine that device 240 is no longer on vehicle 200.

In one embodiment, processing unit 210 generates an exception value due to a loss of the wireless connection before the occurrence of the event. In a further embodiment, processing unit 210 generates a different exception value for different types of losses. For example, processing unit 210 could have a different exception value if the wireless connection becomes weak, if device 240 sends out a signal that power is low before the loss of the connection, if device 240 is suddenly cut off, or if the connection is intermittent such that each wireless connection profile could have a different exception value based on the probable cause of the wireless connection loss or change. In a further embodiment, the ramification of the exception value can meet the probable cause. For example, if device 240 is being tampered with so as to appear as if device 240 is no longer on vehicle 200, an account associated with device 240 could be charged a penalty. In another example, when device 240 loses power, processing unit 210 could determine that device 240 was not intentionally shut down and could charge an account associated with device 240 a base fare. In a further embodiment, processing unit 210 has longer term analytics that run over multiple uses of device 240 such that processing unit 210 generates further exception values/exceptions based on the analysis of that situation. For example, if a device 240 is shut down on multiple rides, processing unit 210 could determine that the shutdowns were intentional and could charge a penalty instead of a base rate.

In one embodiment, the manual activation includes touching device 240 to manual activation sensor 220. In one embodiment, device 240 could be similar to an ID card that requires touching the ID card to manual activation sensor 220. In an embodiment, touching means bringing device 240 close enough to manual activation sensor 220 for a close-range connection method to take place in order to verify that device 240 is on vehicle 200 with processing unit 210 and has been used to check in for a ride on vehicle 200. For example, the close manual activation could prevent a false ride from being activated by someone who is in close proximity to the vehicle 200 and could allow a driver of vehicle 200 to verify that each individual who gets on the vehicle 200 has been checked in. In one embodiment, processing unit 210 has a display that shows the status of each device 240 as each device 240 is checked in and account information associated with device 240. In one embodiment, processing unit 210 gives a tone signaling if each device 240 has a valid account associated with device 240 as each device 240 is manually checked in. For example, one tone could signal the successful acquisition of a ticket for the account associated with device 240, and one tone could signal the failure to acquire a ticket for the account associated with device 240.

In one embodiment, device 240 is a portable electronic device 240. The present invention is compatible with any portable device 240 that is able to send a wireless signal or that can be read wirelessly. In one embodiment, device 240 could be a smart phone. In an alternative embodiment, device 240 is a personal ID card. In one embodiment, device 240 has an imbedded RFID chip.

In one embodiment, the system further includes one or more sensors to determine the location of device 240. In one embodiment, the sensors determine the direction of device 240 by having two sensors recording the direction from which the signal is coming. In one embodiment, two or more sensors measure the signal strength of device 240 and determine the location of device 240 based on the signal strength recorded by each of the sensors.

In one embodiment, a processing unit for managing tickets includes a processing unit having a manual sensor and a wireless sensor, a device capable of interacting with the processing unit, where the processing unit establishes a manual connection channel between the device and the processing unit, where the processing unit establishes one or more wireless connection channels between the device and the processing unit, where wireless connections are timed to be coordinated with critical ticket events.

In one embodiment, the processing unit measures the signal as a vehicle, with the processing unit on the vehicle, leaves a stop. Once the signal gets weak enough, the processing unit could determine that the device was left at the stop and could charge an account associated with the device for the ride. In an alternative embodiment, the processing unit checks to see if the device is connected after a vehicle, with the processing unit on the vehicle, leaves a stop. If the device is no longer connected, the processing unit can determine that the device was left at the stop and charge an account associated with the device.

In one embodiment, a first type of critical ticket event occurs before a vehicle door is open and a second type of critical ticket event occurs after the vehicle door is closed, where the vehicle includes a processing unit. In one embodiment, the critical ticket events occur when the processing unit needs to determine the location of the device. In one embodiment, a critical ticket event occurs periodically throughout a trip of a vehicle in which the processing unit is installed. In one embodiment, one critical ticket event occurs before a stop of a vehicle in which the processing unit is installed, and a second critical ticket event occurs after a stop of the vehicle. The critical ticket events allow the processing unit to determine the portion of the trip that the device is on the vehicle.

In one embodiment, the processing unit generates an exception in response to a failure of the device to connect at the first critical ticket event. The exception can be a fine, an increased fare, or a generation of an estimated duration of time in which the device is on a vehicle in which the processing unit is installed.

In one embodiment, the processing unit records a signal strength of the wireless connection channel and compares the signal strength to a lookup table to determine the distance of the device from the processing unit. In one embodiment, a baseline signal strength is recorded at the same time the device is manually checked in. In one embodiment, a baseline signal strength is recorded directly after the manual check in. In a further embodiment, the baseline signal strength is used to determine the signal strength values for the lookup table. For example, a weak baseline signal strength will lower signal strengths for relative locations on the lookup table, where a strong baseline signal strength will have higher signal strengths for relative locations on the lookup table. In one embodiment, processing unit can include a computer system.

In one embodiment, a manual connection includes at least one of a receptacle or a touch pad to contact the device and a proximity receiver to connect with the device. The manual connection can use any technology that requires direct interaction or proximity interaction of the device with the processing unit.

In one embodiment, at least one sensor is used to determine the location of the device. In one embodiment, the sensor determines the location of the device based on the signal strength or any other location method for determining the location or direction of the device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
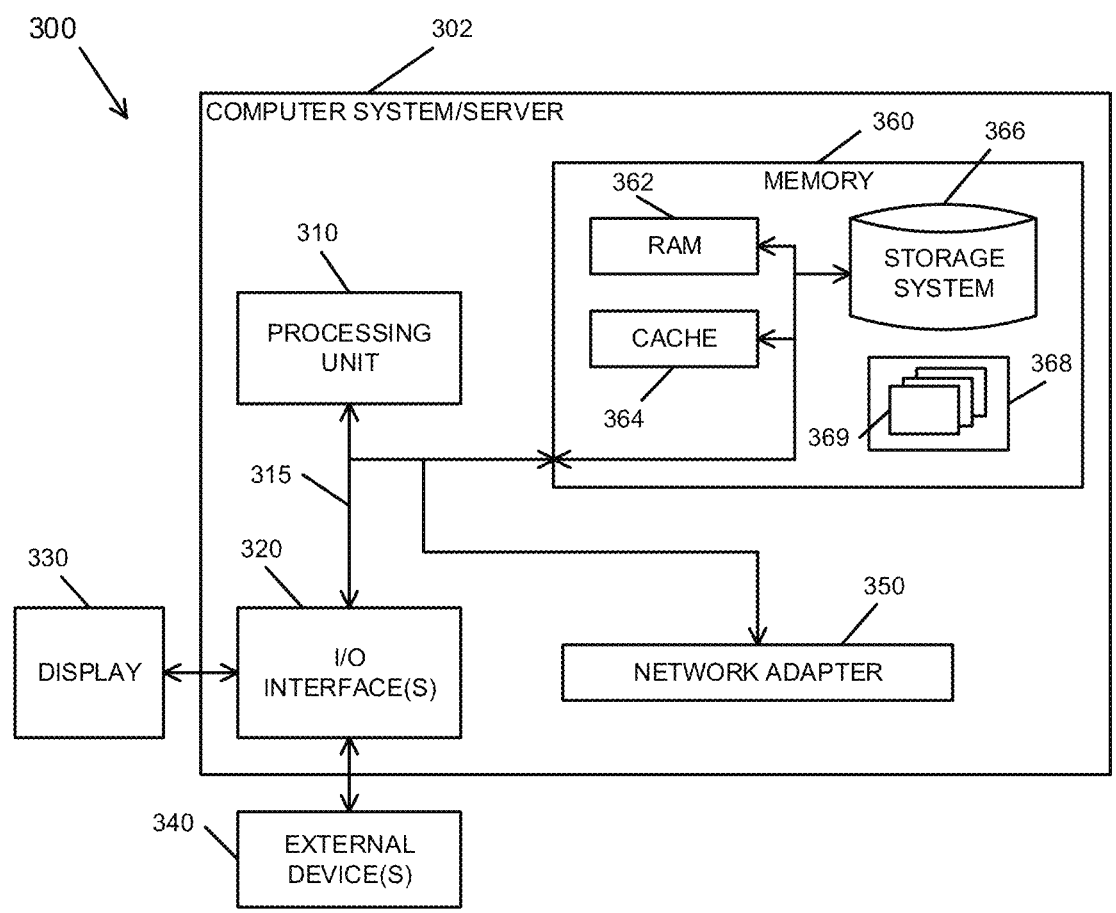
FIG. 3 depicts a processing unit, according to various embodiments.

FIG. 3 shows an exemplary embodiment of a computer system, computer system 300. Computer system 300 is only one example of a computer system and is not intended to suggest any limitation as to the scope of use or functionality of embodiments of the present invention. Regardless, computer system 300 is capable of being implemented to perform and/or performing any of the functionality/operations of the present invention.

Computer system 300 includes a computer system/server 302, which is operational with numerous other general purpose or special purpose processing unit environments or configurations. Examples of well-known processing units, environments, and/or configurations that may be suitable for use with computer system/server 302 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 302 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 302 in cloud computing node 300 is shown in the form of a general-purpose computing device. The components of computer system/server 302 may include, but are not limited to, one or more processors or processing units 310, a system memory 360, and a bus 315 that couple various system components including system memory 360 to processor 310.

Bus 315 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 360 can include computer system readable media in the form of volatile memory, such as random access memory (RAM) 362 and/or cache memory 364. Computer system/server 302 may further include other removable/non-removable, volatile/non-volatile computer system storage media. By way of example only, storage system 366 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 315 by one or more data media interfaces. As will be further depicted and described below, memory 360 may include at least one program product having a set (e.g., at least one) of program modules that are configured to carry out the functions of embodiments of the invention.

Program/utility 368, having a set (at least one) of program modules 369, may be stored in memory 360 by way of example, and not limitation, as well as an operating system, one or more application programs, other program modules, and program data. Each of the operating system, one or more application programs, other program modules, and program data or some combination thereof, may include an implementation of a networking environment. Program modules 369 generally carry out the functions and/or methodologies of embodiments of the invention as described herein.

Computer system/server 302 may also communicate with one or more external devices 340 such as a keyboard, a pointing device, a display 330, etc.; one or more devices that enable a user to interact with computer system/server 302; and/or any devices (e.g., network card, modem, etc.) that enable computer system/server 302 to communicate with one or more other computing devices. Such communication can occur via Input/Output (I/O) interfaces 320. Still yet, computer system/server 302 can communicate with one or more networks such as a local area network (LAN), a general wide area network (WAN), and/or a public network (e.g., the Internet) via network adapter 350. As depicted, network adapter 350 communicates with the other components of computer system/server 302 via bus 315. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for monitoring a ticket, the method comprising:
   receiving credentials by a processing unit from a device via manual presentation of the device to a manual sensor logically coupled to the processing unit on a vehicle;
   generating a ticket identifier (ID) by the processing unit based on the credentials;
   transmitting the ticket ID from the processing unit to the device;
   establishing a wireless connection between the device and the processing unit;
   monitoring a signal strength of the wireless connection between the processing unit and the device;
   detecting a loss of the wireless connection;
   determining, based on the monitoring, that a type of the loss of the wireless connection is an abrupt loss type;
   determining, based on the type of the loss, that the loss of the wireless connection was not due to the device moving away from the processing unit;
   updating a status of an account associated with the ticket ID in light of the determining that loss of the wireless connection was not due to the device moving away from the processing unit; and
   charging the account a fee based on the status.

2. The method according to claim 1, further comprising monitoring the wireless connection before the vehicle comes to a stop and during the stop.

3. The method according to claim 1, wherein the monitoring comprises:
   recording a signal strength of the wireless connection between the processing unit and the device; and
   comparing the signal strength to a lookup table to determine a distance of the device from the processing unit.

4. The method according to claim 1, wherein the device is a portable electronic device.

5. The method according to claim 1, further comprising determining a location of the device via at least one sensor.

6. A system for monitoring a ticket, the system comprising:
   a memory; and
   a processing unit communicatively coupled to the memory, wherein the processing unit performs:
      receiving credentials by a processing unit from a device via manual presentation of the device to a manual sensor logically coupled to the processing unit;
      generating a ticket identifier (ID) by the processing unit based on the credentials;
      transmitting the ticket ID from the processing unit to the device;
      establishing a wireless connection between the device and the processing unit via manual activation;
      monitoring a signal strength of the wireless connection between the processing unit and the device;
      detecting a loss of the wireless connection;
      determining, based on the monitoring, that a type of the loss of the wireless connection is an abrupt loss type;
      determining, based on the type of the loss, that the loss of the wireless connection was not due to the device moving away from the processing unit;
      updating a status of an account associated with the ticket ID in light of the determining that the loss of the wireless connection was not due to the device moving away from the processing unit; and charging the account a fee based on the status.

7. The system of claim 6, wherein the monitoring comprises:

recording a signal strength of the wireless connection; and comparing the signal strength to a lookup table to determine a distance of the device from the processing unit.

8. The system of claim 6, wherein the processing unit further performs generating an exception value indicating the type of the loss of the wireless connection during the monitoring.

9. The system of claim 6, wherein the manual activation comprises touching the device to the manual activation sensor.

10. The system of claim 6, wherein the device is a portable electronic device.

11. The system of claim 6, further comprising one or more sensors to determine the location of the device.

12. A computer program product for monitoring a ticket, the computer program product comprising a computer readable storage medium having program instructions embodied therewith, the program instructions readable and executable by a processor to cause the processor to perform:

receiving credentials by a processing unit from a device via manual presentation of the device to a manual sensor logically coupled to the processing unit;

generating a ticket identifier (ID) by the processing unit based on the credentials;

transmitting the ticket ID from the processing unit to the device;

establishing a wireless connection between the device and the processing unit;

monitoring a signal strength of the wireless connection between the processing unit and the device;

detecting a loss of the wireless connection;

determining, based on the monitoring, that a type of the loss of the wireless connection is a gradual loss type;

determining, based on the type of the loss, that the loss of the wireless connection was due to the device moving away from the processing unit;

updating a status of an account associated with the ticket ID in light of the determining that the loss of the wireless connection was due to the device moving away from the processing unit; and charging the account a fee based on the status.

13. The computer program product of claim 12, wherein the instructions further cause the processor to perform monitoring the wireless connection before a stop and during the stop.

14. The computer program product of claim 12, wherein the monitoring comprises:

recording a signal strength of the wireless connection; and comparing the signal strength to a lookup table to determine a distance of the device from the processing unit.

15. The computer program product of claim 12, wherein the updating comprises charging an account associated with the ticket ID a fee based on the exception value.

16. The computer program product of claim 12, wherein the device is a portable electronic device.

\* \* \* \* \*